(12) United States Patent
Iida

(10) Patent No.: US 8,734,095 B2
(45) Date of Patent: May 27, 2014

(54) GAS TURBINE

(75) Inventor: Koichiro Iida, Hyogo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 612 days.

(21) Appl. No.: 13/122,580

(22) PCT Filed: Mar. 16, 2010

(86) PCT No.: PCT/JP2010/054407
§ 371 (c)(1),
(2), (4) Date: Apr. 5, 2011

(87) PCT Pub. No.: WO2010/107015
PCT Pub. Date: Sep. 23, 2010

(65) Prior Publication Data
US 2011/0189003 A1 Aug. 4, 2011

(30) Foreign Application Priority Data

Mar. 19, 2009 (JP) ................................. 2009-068716

(51) Int. Cl.
*F01D 1/02* (2006.01)
*F01D 9/04* (2006.01)
*F01D 5/14* (2006.01)

(52) U.S. Cl.
CPC ................ *F01D 5/141* (2013.01); *F01D 5/142* (2013.01); *F01D 9/041* (2013.01); *Y02T 50/673* (2013.01)
USPC ........ 415/191; 415/193; 415/194; 415/199.5; 415/209.1

(58) Field of Classification Search
CPC ......... F01D 4/141; F01D 5/142; F01D 9/041; Y02T 50/673
USPC .................... 415/191, 193, 194, 199.5, 209.1
See application file for complete search history.

(56) References Cited

U.S. PATENT DOCUMENTS

| | | | | |
|---|---|---|---|---|
| 3,112,866 | A | * 12/1963 | Fortescue | ...................... 415/194 |
| 4,968,216 | A | * 11/1990 | Anderson et al. | .......... 415/199.5 |
| 5,486,091 | A | 1/1996 | Sharma | |
| 6,402,458 | B1 | 6/2002 | Turner | |

(Continued)

FOREIGN PATENT DOCUMENTS

| JP | 54-114618 A | 9/1979 |
|---|---|---|
| JP | 9-512320 A | 12/1997 |

(Continued)

OTHER PUBLICATIONS

Japanese Office Action dated Dec. 25, 2012, issued in corresponding Japanese Patent Application No. 2009-068716, with English translation (8 pages).

(Continued)

*Primary Examiner* — Igor Kershteyn
(74) *Attorney, Agent, or Firm* — Westerman, Hattori, Daniels & Adrian, LLP

(57) ABSTRACT

A gas turbine that can effectively cool an axial cavity between a stator blade and a rotor blade and a blade-end surface is provided. In a gas turbine in which a blade-count difference between stator-blade segments of a second-stage stator blade and a third-stage stator blade is set to zero, a relative position between the second-stage stator blade and the third-stage stator blade in the circumferential direction is set by clocking so that a wake flow produced by the stator-blade segments of the second-stage stator blade is guided to the leading edges of the stator-blade segments of the third-stage stator blade within a range of 0% to 15% of the length in a span direction from a hub side of the stator-blade segments of the third-stage stator blade.

4 Claims, 9 Drawing Sheets

(56) References Cited

U.S. PATENT DOCUMENTS

| | | | |
|---|---|---|---|
| 6,527,503 B2* | 3/2003 | Spano et al. | 415/193 |
| 7,758,297 B2* | 7/2010 | Fiala | 415/199.5 |
| 2006/0257238 A1 | 11/2006 | Fiala | |
| 2009/0155062 A1 | 6/2009 | Guimbard et al. | |
| 2010/0122538 A1* | 5/2010 | Ning et al. | 415/193 |

FOREIGN PATENT DOCUMENTS

| | | |
|---|---|---|
| JP | 2002-155701 A | 5/2002 |
| JP | 2009-144716 A | 7/2009 |

OTHER PUBLICATIONS

Decision to Grant a Patent dated Aug. 27, 2013, issued in corresponding Japanese Patent Application No. 2009-068716, national entry No. PCT/JP2010/054407.

C. Cao et al.,; "Interaction of Rim Seal and Annulus Flows in an Axial Flow Turbine"; Journal of Engineering for Gas Turbines and Power; Oct. 2004; vol. 126; pp. 786-793.

International Search Report of PCT/JP2010/054407, mailing dated Jun. 15, 2010.

Ralf Jakoby et al., ASME Paper; "Numerical Simulation of the Unsteady Flow Field in an Axial Gas Turbine Rim Seal Configuration"; Proceeding of ASME Turbo Expo 2004, Power for Land, Sea and Air , Jun. 14-17, Vienna, Austria; GT2004-53829; pp. 1-10, Jun. 2004.

Korean Office Action dated May 22, 2013, issued in corresponding Korean Patent Application No. 10-2011-7008077 (2 pages).

Chinese Office Action dated Jan. 16, 2014, in corresponding to Chinese Application No. 201080002931.5 with English Translation. (15 pages).

* cited by examiner

GAS TURBINE

TECHNICAL FIELD

The present invention relates to gas turbines.

BACKGROUND ART

Due to the increasing inlet gas temperature of gas turbines, there is a need to ensure the reliability and durability of, for example, a section near the main flow and the inside of an axial cavity (i.e., a gap in the axial direction) formed between a rotor-blade rotating disk and a stator-blade ring at the upstream side or the downstream side thereof with a smaller amount of sealing air (i.e., air leaking from the inside of the cavity toward the main flow and having a temperature lower than that of the main flow).

Generally, in order to improve the reliability of axial cavity sections between blade rows, it is necessary to increase the amount of sealing air in the axial cavities to prevent the entry of high-temperature main-flow gas. However, increasing the amount of sealing air leads to reduced performance of the gas turbine.

Furthermore, although the sealing air leaking into the main flow from the axial cavities between the blade rows is a gas with a temperature lower than that of the main flow and has an ability to cool the blade surfaces (including a shroud and a platform surface), since a flow pattern produced by the blades is dominant in the main-flow section, such as the blade surfaces, it is difficult to effectively perform cooling using this leaking sealing air.

It is known from the operation histories and rig tests of gas turbines, as well as from NPL 1, that the pressure distribution and temperature distribution as well as vortexes at several large circumferential intervals around the entire circumference (360 degrees) or at large intervals over a circumferential range covering multiple blades tend to occur inside the axial cavities due to the nature of the flow, in addition to the pressure distribution and gas temperature distribution occurring at small circumferential intervals every other stator blade or rotor blade in the main flow. Furthermore, in an actual gas turbine engine, it is structurally difficult to achieve perfect symmetry in the circumferential direction, and structural asymmetry in the circumferential direction is one factor that causes a pressure distribution of one to several cycles to occur over the entire circumference within the axial cavities.

Therefore, during the design process, it is necessary to set an extra amount of sealing air in view of such unevenness in the circumferential direction.

On the other hand, it is known from a Computational Fluid Dynamics (CFD) analysis and from NPL 2 that the pressure distribution and temperature distribution around the entire circumference occur not only at the cavity side, but also at the main-flow side depending on a blade-count difference between stator blades or a blade-count difference between rotor blades, as shown in, for example, FIG. 9. The problem in this case is the occurrence of the distribution at large intervals of one to four cycles over the entire circumference, which can occur when the blade-count difference is small, such as about one to four. Regarding such a distribution over a circumferential range covering multiple blades, it is difficult to achieve uniformity, compared with the pressure distribution and temperature distribution occurring every other blade.

In order for the sealing air to leak into the main flow from the axial cavities between the blade rows, the pressure within the cavities needs to be higher than that of the main flow. However, in the case where the pressure distribution at large intervals (in small cycles between about one and four) occurs at both the axial-cavity side and the main-flow side, as described above, when a low in the pressure distribution on the axial-cavity side and a high in the pressure distribution on the main-flow side are aligned with each other, there is an increased risk of main-flow gas over the circumferential range covering multiple blades entering the axial cavities between the blade rows. With such a configuration, the durability of the components is significantly reduced.

PTL 1 discloses changing the relative position, in the circumferential direction, between stator blades in front and rear stages (that is, clocking) so as to make a wake flow produced by a blade surface of the upstream stator blade reach the downstream stator blade, thereby improving the performance.

PTL 2 discloses a method that changes the relative position, in the circumferential direction, between the stator blades in front and rear stages so as to cool the downstream blade using a wake flow produced by the upstream stator blade or using cooling air blowing out from the upstream stator blade.

CITATION LIST

Non Patent Literature

{NPL 1}
Journal of Engineering for Gas Turbines and Power, October 2004, Vol. 126, No. 4, pp. 786-793
{NPL 2}
ASME paper, GT2004-53829 (pp. 1-10)

Patent Literature

{PTL 1}
Japanese Translation of PCT International Application, Publication No. Hei 9-512320
{PTL 2}
Japanese Unexamined Patent Application, Publication No. 2002-155701

SUMMARY OF INVENTION

Technical Problem

However, because PTL 1 is simply intended for improving the performance and is therefore mainly made in view of the main flow of combustion gas, it is not made in view of the existence of axial cavities between the stator blades and the rotor blades, the existence of sealing air leaking therefrom, and the durability of components exposed to high-temperature gas.

On the other hand, PTL 2 is made in view of the durability of components exposed to high-temperature gas but not in view of the existence of axial cavities between the stator blades and the rotor blades or the existence of sealing air leaking therefrom. Furthermore, in a blade-row arrangement of three consecutive blades, i.e., a stator blade, a rotor blade, and a stator blade, for example, PTL 2 utilizes the wake flow from the upstream stator blade or the low-temperature air blowing out from the stator-blade surface of the upstream stator blade to cool the downstream stator blade. Because the low-temperature gas blowing out from the upstream stator blade passes through the intermediate rotating rotor blade before reaching the downstream stator blade, the low-temperature air is agitated in mid-flow so as to be mixed with high-temperature main-flow gas before reaching the downstream stator blade, resulting in reduced cooling performance.

In contrast, the present inventor has focused on the existence of a hub-side or tip-side axial cavity located immediately upstream of a blade, and also on the problem of the durability of the axial-cavity section, as well as on the fact that the sealing air leaking into the main flow from the axial cavity and having a temperature lower than that of the main flow is not effectively used for cooling a blade immediately downstream.

In view of the circumstances described above, it is an object of the present invention to provide a gas turbine that can ensure the durability of an axial cavity section with a smaller amount of sealing air, and that can effectively cool a blade immediately downstream using sealing air leaking from an axial cavity.

Solution to Problem

In order to solve the aforementioned problems, a gas turbine according to the present invention employs the following solutions.

Specifically, a gas turbine according to a first aspect of the present invention includes an n-th stage stator blade having a plurality of stator-blade segments extending in a radial direction and provided at a predetermined pitch in a circumferential direction, n being a positive integer; an n-th stage rotor blade disposed at a downstream side of the n-th stage stator blade in a direction of flow of combustion gas, the n-th stage rotor blade having a plurality of rotor-blade segments extending in the radial direction and provided around an outer periphery of a rotor at a predetermined pitch in the circumferential direction; an (n+1)-th stage stator blade disposed at the downstream side of the n-th stage rotor blade in the direction of flow of the combustion gas, the (n+1)-th stage stator blade having a plurality of stator-blade segments extending in the radial direction and provided at a predetermined pitch in the circumferential direction; and an (n+1)-th stage rotor blade disposed at the downstream side of the (n+1)-th stage stator blade in the direction of flow of the combustion gas, the (n+1)-th stage rotor blade having a plurality of rotor-blade segments extending in the radial direction and provided around the outer periphery of the rotor at a predetermined pitch in the circumferential direction. A blade-count difference between the stator-blade segments of the n-th stage stator blade and the stator-blade segments of the (n+1)-th stage stator blade is set to zero or to five or more, and/or a blade-count difference between the rotor-blade segments of the n-th stage rotor blade and the rotor-blade segments of the (n+1)-th stage rotor blade is set to zero or to five or more. A relative position between the n-th stage stator blade and the (n+1)-th stage stator blade in the circumferential direction is set such that a wake flow produced by the stator-blade segments of the n-th stage stator blade is guided to a ±¼ pitch region in the circumferential direction with respect to a leading edge of each stator-blade segment of the (n+1)-th stage stator blade and within a range of 0% to 15% and/or a range of 85% to 100% of the length in a span direction from a hub side of the stator-blade segment of the (n+1)-th stage stator blade, one pitch being equal to a distance between adjacent stator-blade segments in the circumferential direction.

Since the blade-count difference between the stator-blade segments of the n-th stage stator blade and the stator-blade segments of the (n+1)-th stage stator blade and/or the blade-count difference between the rotor-blade segments of the n-th stage rotor blade and the rotor-blade segments of the (n+1)-th stage rotor blade is/are set to zero or to five or more, a pressure distribution or temperature distribution of a relatively low periodicity of one to four cycles over the entire circumference, which can occur when the blade-count difference is one to four, can be avoided.

In addition, the relative position between the n-th stage stator blade and the (n+1)-th stage stator blade in the circumferential direction is adjusted so that the wake flow produced by the stator-blade segments of the n-th stage stator blade is guided to the ±¼ pitch region in the circumferential direction with respect to the leading edge of each stator-blade segment of the (n+1)-th stage stator blade and within a hub range of 0% to 15% and/or a tip range of 85% to 100% of the span of the stator-blade segment. This facilitates cooling of the hub region or the tip region of the (n+1)-th stator blade, thereby improving the cooling of the hub region or the tip region, which is difficult in the related art. In particular, since the flow in the hub region is improved, the flow of sealing air guided from the cavity formed at the hub side between the n-th stage rotor blade and the (n+1)-th stage stator blade can be used effectively, thereby allowing for cooling without leading to a reduction in gas-turbine efficiency.

A gas turbine according to a second aspect of the present invention includes an n-th stage stator blade having a plurality of stator-blade segments extending in a radial direction and provided at a predetermined pitch in a circumferential direction, n being a positive integer; an n-th stage rotor blade disposed at a downstream side of the n-th stage stator blade in a direction of flow of combustion gas, the n-th stage rotor blade having a plurality of rotor-blade segments extending in the radial direction and provided around an outer periphery of a rotor at a predetermined pitch in the circumferential direction; an (n+1)-th stage stator blade disposed at the downstream side of the n-th stage rotor blade in the direction of flow of the combustion gas, the (n+1)-th stage stator blade having a plurality of stator-blade segments extending in the radial direction and provided at a predetermined pitch in the circumferential direction; and an (n+1)-th stage rotor blade disposed at the downstream side of the (n+1)-th stage stator blade in the direction of flow of the combustion gas, the (n+1)-th stage rotor blade having a plurality of rotor-blade segments extending in the radial direction and provided around the outer periphery of the rotor at a predetermined pitch in the circumferential direction. A blade-count difference between the stator-blade segments of the n-th stage stator blade and the stator-blade segments of the (n+1)-th stage stator blade is set to zero or to five or more, and/or a blade-count difference between the rotor-blade segments of the n-th stage rotor blade and the rotor-blade segments of the (n+1)-th stage rotor blade is set to zero or to five or more. A relative position between the n-th stage stator blade and the (n+1)-th stage stator blade in the circumferential direction is set such that sealing air flowing over a surface of a hub shroud of the (n+1)-th stage stator blade from a cavity formed at a hub side of the n-th stage rotor blade and the (n+1)-th stage stator blade is made to flow toward a peak thermal stress position at the surface of the hub shroud.

Since the blade-count difference between the stator-blade segments of the n-th stage stator blade and the stator-blade segments of the (n+1)-th stage stator blade and/or the blade-count difference between the rotor-blade segments of the n-th stage rotor blade and the rotor-blade segments of the (n+1)-th stage rotor blade is/are set to zero or to five or more, a pressure distribution or temperature distribution of a relatively low periodicity of one to four cycles over the entire circumference, which can occur when the blade-count difference is one to four, can be avoided.

In addition, the relative position between the n-th stage stator blade and the (n+1)-th stage stator blade in the circumferential direction is adjusted so that the flow of sealing air flowing over the hub shroud of the (n+1)-th stage stator blade from the cavity between the n-th stage rotor blade and the (n+1)-th stage stator blade is made to flow toward the peak thermal stress position at the surface of the hub shroud. Thus, peak thermal stress in the hub shroud of the (n+1)-th stage stator blade can be reduced.

The "peak thermal stress position" can be regarded as an area of locally high temperature on the basis of a simulation of a thermal fluid field. By changing the relative position between the n-th stage stator blade and the (n+1)-th stage stator blade in the circumferential direction, the relative position in the circumferential direction is adjusted so as to make the sealing air flow toward the obtained peak thermal stress position.

It is preferable that the gas turbine according to the first aspect or the second aspect of the present invention further include an (n+2)-th stage stator blade disposed at the downstream side of the (n+1)-th stage rotor blade in the direction of flow of the combustion gas, the (n+2)-th stage stator blade having a plurality of stator-blade segments extending in the radial direction and provided at a predetermined pitch in the circumferential direction; and an (n+2)-th stage rotor blade disposed at the downstream side of the (n+2)-th stage stator blade in the direction of flow of the combustion gas, the (n+2)-th stage rotor blade having a plurality of rotor-blade segments extending in the radial direction and provided around the outer periphery of the rotor at a predetermined pitch in the circumferential direction. In this case, a blade-count difference between the stator-blade segments of the (n+1)-th stage stator blade and the stator-blade segments of the (n+2)-th stage stator blade is preferably set to zero or to five or more, and/or a blade-count difference between the rotor-blade segments of the (n+1)-th stage rotor blade and the rotor-blade segments of the (n+2)-th stage rotor blade is preferably set to zero or to five or more.

The blade-count difference between the stator-blade segments of the (n+1)-th stage stator blade and the stator-blade segments of the (n+2)-th stage stator blade and/or the blade-count difference between the rotor-blade segments of the (n+1)-th stage rotor blade and the rotor-blade segments of the (n+2)-th stage rotor blade is/are set to zero or to five or more. Thus, a pressure distribution or temperature distribution of a relatively low periodicity of one to four cycles can be avoided for stator blades or rotor blades of the three consecutive stages (n-th stage, (n+1)-th stage, and (n+2)-th stage).

A gas turbine according to a third aspect of the present invention includes an n-th stage stator blade having a plurality of stator-blade segments extending in a radial direction and provided at a predetermined pitch in a circumferential direction, n being a positive integer; an n-th stage rotor blade disposed at a downstream side of the n-th stage stator blade in a direction of flow of combustion gas, the n-th stage rotor blade having a plurality of rotor-blade segments extending in the radial direction and provided around an outer periphery of a rotor at a predetermined pitch in the circumferential direction; an (n+1)-th stage stator blade disposed at the downstream side of the n-th stage rotor blade in the direction of flow of the combustion gas, the (n+1)-th stage stator blade having a plurality of stator-blade segments extending in the radial direction and provided at a predetermined pitch in the circumferential direction; an (n+1)-th stage rotor blade disposed at the downstream side of the (n+1)-th stage stator blade in the direction of flow of the combustion gas, the (n+1)-th stage rotor blade having a plurality of rotor-blade segments extending in the radial direction and provided around the outer periphery of the rotor at a predetermined pitch in the circumferential direction; an (n+2)-th stage stator blade disposed at the downstream side of the (n+1)-th stage rotor blade in the direction of flow of the combustion gas, the (n+2)-th stage stator blade having a plurality of stator-blade segments extending in the radial direction and provided at a predetermined pitch in the circumferential direction; and an (n+2)-th stage rotor blade disposed at the downstream side of the (n+2)-th stage stator blade in the direction of flow of the combustion gas, the (n+2)-th stage rotor blade having a plurality of rotor-blade segments extending in the radial direction and provided around the outer periphery of the rotor at a predetermined pitch in the circumferential direction. A blade count of the stator-blade segments and a blade count of the rotor-blade segments are set to 20 or more. A blade-count difference between the stator-blade segments of the n-th stage stator blade and the stator-blade segments of the (n+1)-th stage stator blade and a blade-count difference between the stator-blade segments of the (n+1)-th stage stator blade and the stator-blade segments of the (n+2)-th stage stator blade are set to zero or to five or more, and/or a blade-count difference between the rotor-blade segments of the n-th stage rotor blade and the rotor-blade segments of the (n+1)-th stage rotor blade and a blade-count difference between the rotor-blade segments of the (n+1)-th stage rotor blade and the rotor-blade segments of the (n+2)-th stage rotor blade are set to zero or to five or more. A blade-count ratio of the stator-blade segments between the n-th stage stator blade, the (n+1)-th stage stator blade, and the (n+2)-th stage stator blade or a blade-count ratio of the rotor blade segments between the n-th stage rotor blade, the (n+1)-th stage rotor blade, and the (n+2)-th stage rotor blade is set to an integer ratio ranging between 1 and 4, but excluding 1:1:1.

By setting the blade-count ratio of the blade segments between stator blades or rotor blades of three consecutive stages to an integer ratio ranging between 1 and 4 (e.g., 36:36:54 (2:2:3)), the denseness and sparseness repeat every set of four or fewer blade segments in the front and rear stages. Thus, a pressure distribution or temperature distribution of a relatively low periodicity of one to four cycles can be avoided.

When the blade count of the stator-blade segments or rotor-blade segments is fewer than 20, since the denseness and the sparseness repeat every set of four or fewer blade segments in the front and rear stages even when setting the blade-count ratio to an integer ratio ranging between 1 and 4, 20 or more stator-blade segments or rotor-blade segments are required.

Advantageous Effects of Invention

According to the present invention, since clocking for changing the relative position, in the circumferential direction, between upstream and downstream stator blades or rotor blades is performed, the hub-side region or the tip-side region of the downstream stator blade can be effectively cooled.

DESCRIPTION OF EMBODIMENTS

Embodiments according to the present invention will be described below with reference to the drawings.

First Embodiment

Figure 1:
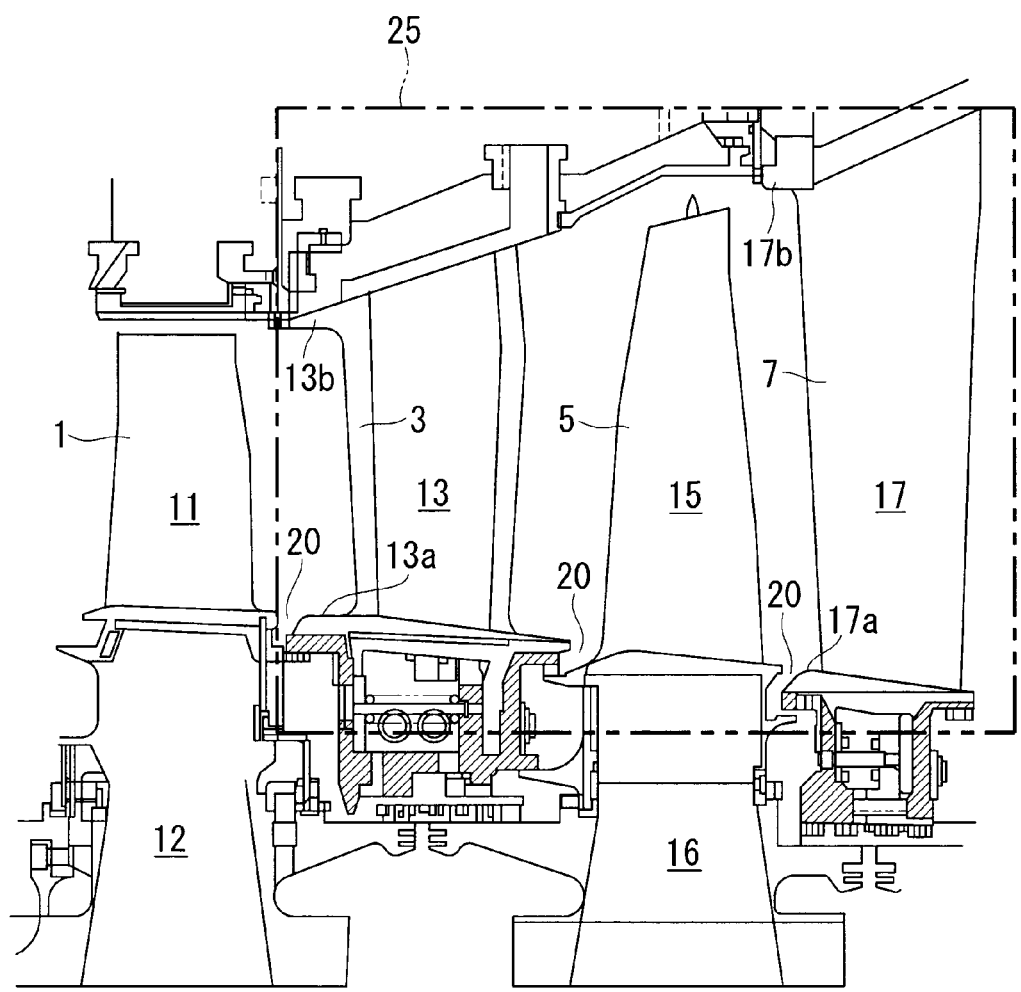
FIG. 1 is a cross-sectional view illustrating a gas turbine according to a first embodiment of the present invention.

FIG. 1 partially illustrates a turbine unit of a gas turbine in cross section. The turbine unit is connected to an axial-flow compressor (not shown) that compresses air and to the downstream side of a combustor (not shown) that combusts fuel using the compressed air as combustion air.

As shown in FIG. 1, a first-stage rotor blade 1, a second-stage stator blade 3, a second-stage rotor blade 5, and a third-stage stator blade 7 are arranged from left to right in the drawing in the direction of flow of the combustion gas from the combustor. A first-stage stator blade disposed upstream of the first-stage rotor blade 1 is not shown. Likewise, a third-stage rotor blade, a fourth-stage stator blade, etc. disposed downstream of the third-stage stator blade 7 are not shown.

Furthermore, although not shown, the rotation axis of the rotor blades 1 and 5 extends horizontally at the lower side of the drawing.

The first-stage rotor blade 1 is provided with a plurality of rotor-blade segments 11 extending in the radial direction. The rotor-blade segments 11 are fixed to a rotor 12 and are equally spaced in the circumferential direction.

The second-stage stator blade 3 is provided with a plurality of stator-blade segments 13 extending in the radial direction. The stator-blade segments 13 are equally spaced in the circumferential direction. The stator-blade segments are fixed at the rotation-axis side via a hub shroud 13a and are fixed at the outer-casing side via a tip shroud 13b.

The second-stage rotor blade 5 is provided with a plurality of rotor-blade segments 15 extending in the radial direction. The rotor-blade segments 15 are fixed to a rotor 16 and are equally spaced in the circumferential direction.

The third-stage stator blade 7 is provided with a plurality of stator-blade segments 17 extending in the radial direction. The stator-blade segments 17 are equally spaced in the circumferential direction. The stator-blade segments are fixed at the rotation-axis side via a hub shroud 17a and are fixed at the outer-casing side via a tip shroud 17b.

Although not shown, the same configurations are given to the third-stage rotor blade and the fourth-stage stator blade.

Axial cavities 20 having gaps in the axial direction are formed between the rotor blades 1 and 5 and the stator blades 3 and 7. The axial cavities are supplied with the compressed air extracted from the compressor (not shown) as sealing air. The sealing air has a pressure higher than that of main-flow gas (combustion gas) flowing through the blade segments 11, 14, 15, and 17, and leaks into the main-flow gas from the axial cavities 20.

In this embodiment, the blade count of the stator-blade segments 13 of the second-stage stator blade 3 and the blade count of the stator-blade segments 17 of the third-stage stator blade 7 are the same (i.e., a blade-count difference of zero). Furthermore, the blade count of the rotor-blade segments 11 of the first-stage rotor blade 1 and the blade count of the rotor-blade segments 15 of the second-stage rotor blade 5 are the same (i.e., a blade-count difference of zero).

The relative position between the second-stage stator blade 3 and the third-stage stator blade 7 in the circumferential direction is set by clocking so that a wake flow produced by the stator-blade segments 13 of the second-stage stator blade 3 is guided to the leading edges of the stator-blade segments 17 of the third-stage stator blade 7 within a range of 0% to 15% of the length in the span direction from the hub side of the stator-blade segments 17 of the third-stage stator blade 7.

Figure 2:
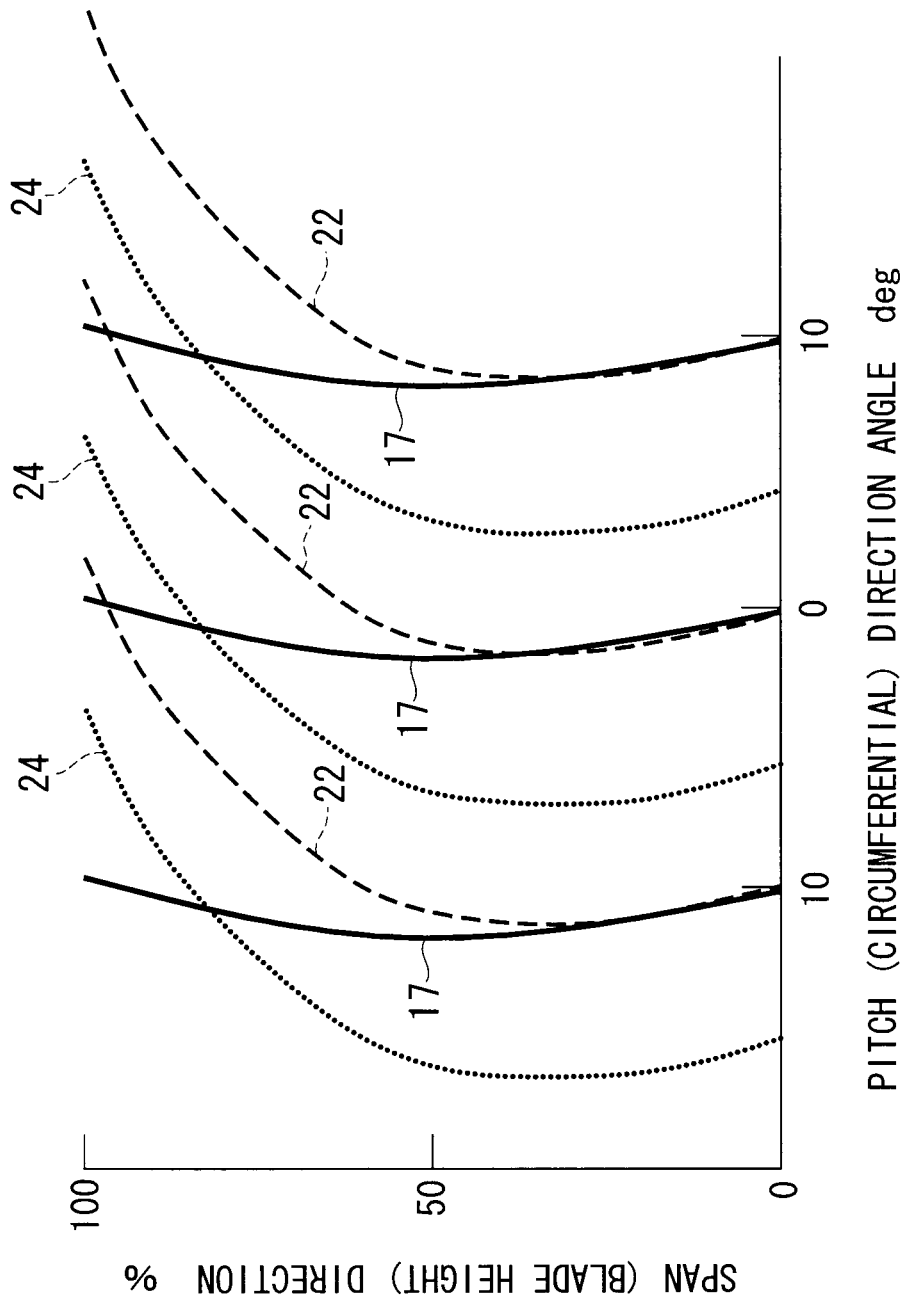
FIG. 2 illustrates the positional relationship between a wake flow and stator-blade segments.

A detailed description will be provided below with reference to FIGS. 2 and 3. FIG. 2 illustrates leading-edge positions of the stator-blade segments 17 of the third-stage stator blade 7 in the span direction. In this drawing, three stator-blade segments 17 are shown every 10 degrees (meaning that there are 36 stator-blade segments around the entire circumference). Reference numeral 22 indicating dashed lines in the graph denotes leading-edge positions of the stator-blade segments 17 of the third-stage stator blade 7 reached by the wake flow produced by the stator-blade segments 13 of the upstream second-stage stator blade 3. Reference numeral 24 indicating dotted lines in the graph denotes leading-edge positions of comparative blade segments for comparison.

Figure 3:
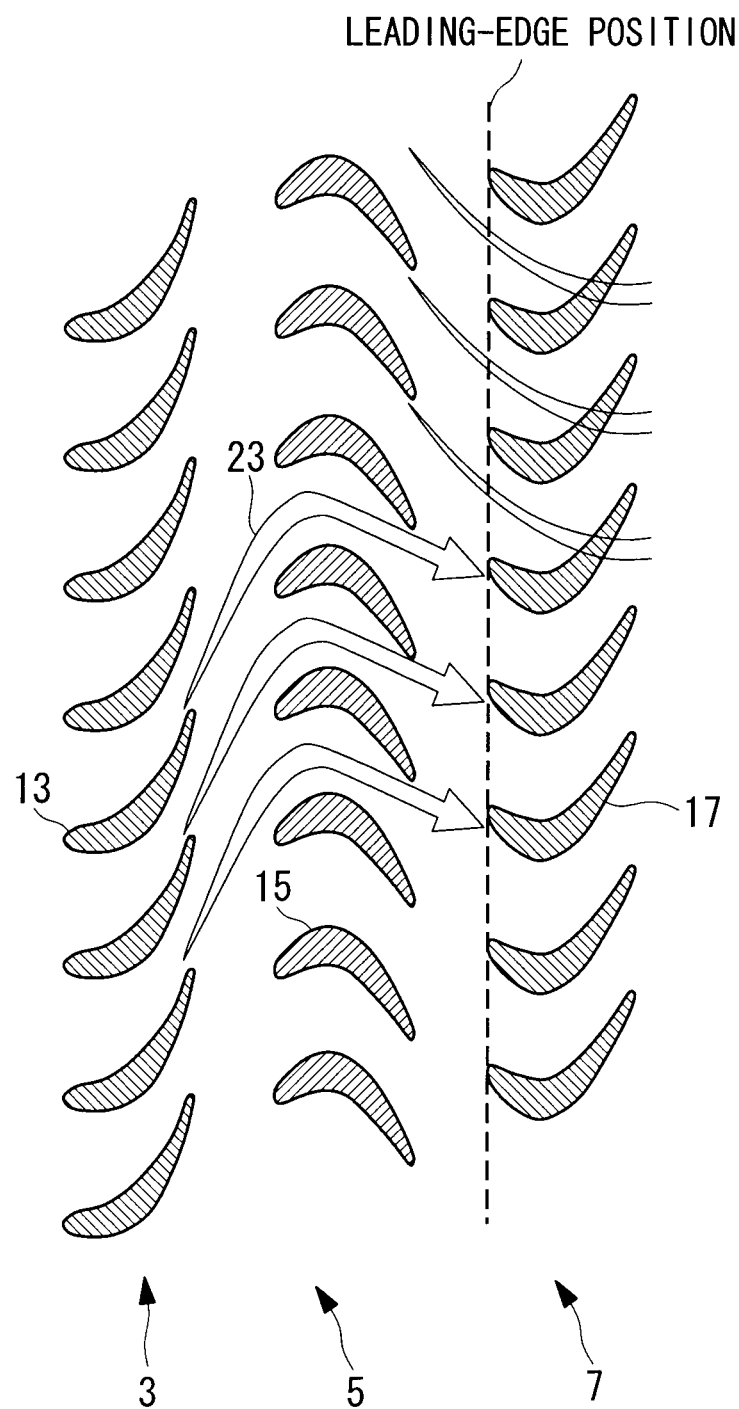
FIG. 3 illustrates blade rows of a second-stage stator blade, a second-stage rotor blade, and a third-stage stator blade.

FIG. 3 illustrates blade rows of the second-stage stator blade 3, the second-stage rotor blade 5, and the third-stage stator blade 7. In this drawing, a wake flow 23 produced by the stator-blade segments 13 of the second-stage stator blade 3 is shown. This wake flow 23 travels through flow paths between the rotor-blade segments 15 so as to be guided to the stator-blade segments 17.

As shown in FIG. 2, in this embodiment, the wake flow 22 produced by the stator-blade segments 13 of the second-stage stator blade 3 is guided to the leading edges of the stator-blade segments 17 of the third-stage stator blade 7 within the range of 0% to 15% of the length in the span direction from the hub side of the stator-blade segments 17 of the third-stage stator blade 7. This can be achieved by performing clocking between the second-stage stator blade 3 and the third-stage stator blade 7 (i.e., changing the relative position in the circumferential direction). A clocking position is actually set by performing a Computational Fluid Dynamics (CFD) analysis. For example, the analysis is performed in a region 25 defined by a double-dashed chain line in FIG. 1. As illustrated by this region 25, the analysis is performed in view of the flow in the axial cavities 20.

FIGS. 4 to 7 illustrate the advantages achieved by this embodiment.

Figure 4:
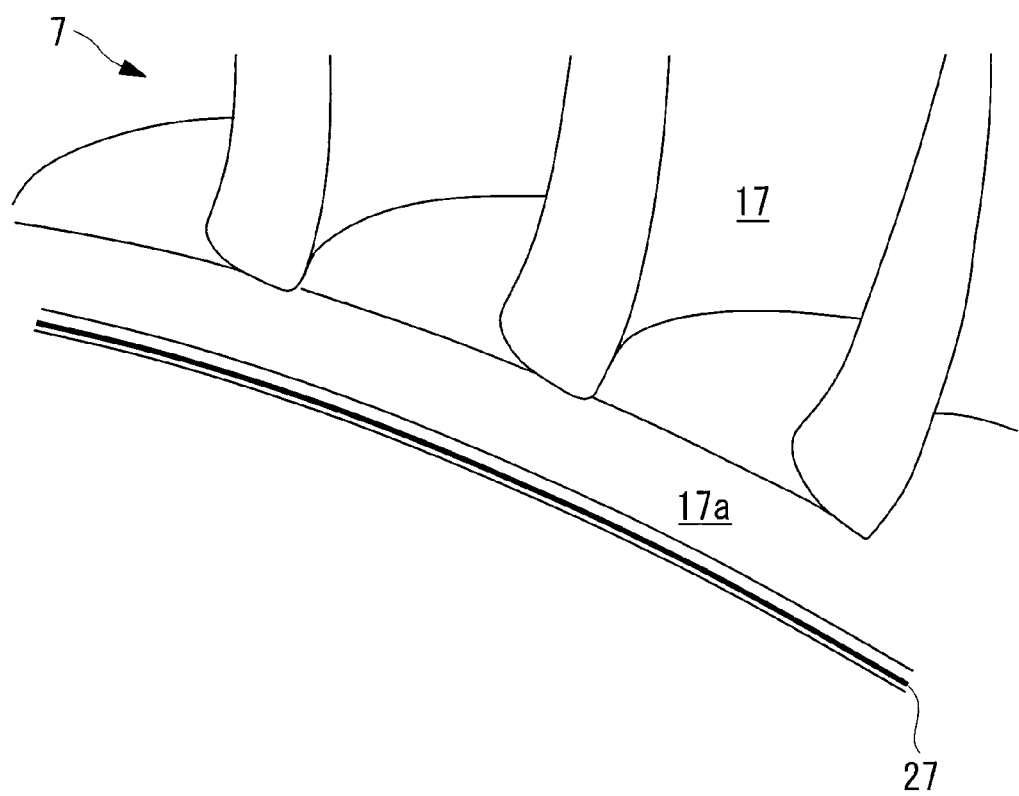
FIG. 4 is a perspective view illustrating a leading edge of a hub shroud of the third-stage stator blade.

FIG. 4 illustrates a position where the pressure and the temperature, which are analysis results, have been evaluated. Specifically, as denoted by reference numeral 27, the pressure and the temperature were evaluated at an intermediate height at the leading edge of the hub shroud 17a for the stator-blade segments 17 of the third-stage stator blade 7.

Figure 5:
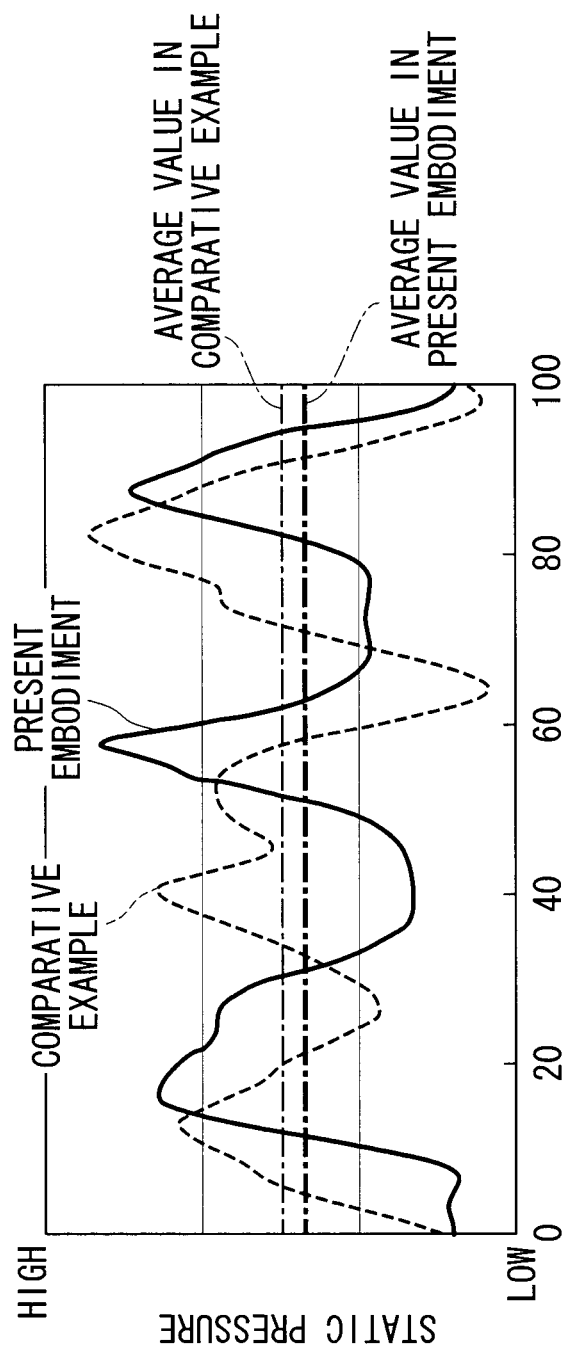
FIG. 5 is a graph illustrating pressure applied to the leading edge of the hub shroud of the third-stage stator blade.

FIG. 5 illustrates the analysis results for the pressure. In the drawing, the thick line corresponds to this embodiment (see reference numeral 17 in FIG. 2), whereas the thin line corresponds to a comparative example (see reference numeral 24 in FIG. 2). It is apparent that, in this embodiment, a difference between maximum and minimum pressures (static pressures) is smaller than that in the comparative example, and that the average pressure is lower. Since the pressure at the leading edge of the hub shroud 17a can be reduced in this manner, it is apparent that a cooling effect for the axial cavities 20 and the surface of the hub shroud 17a can be achieved.

Figure 6A:
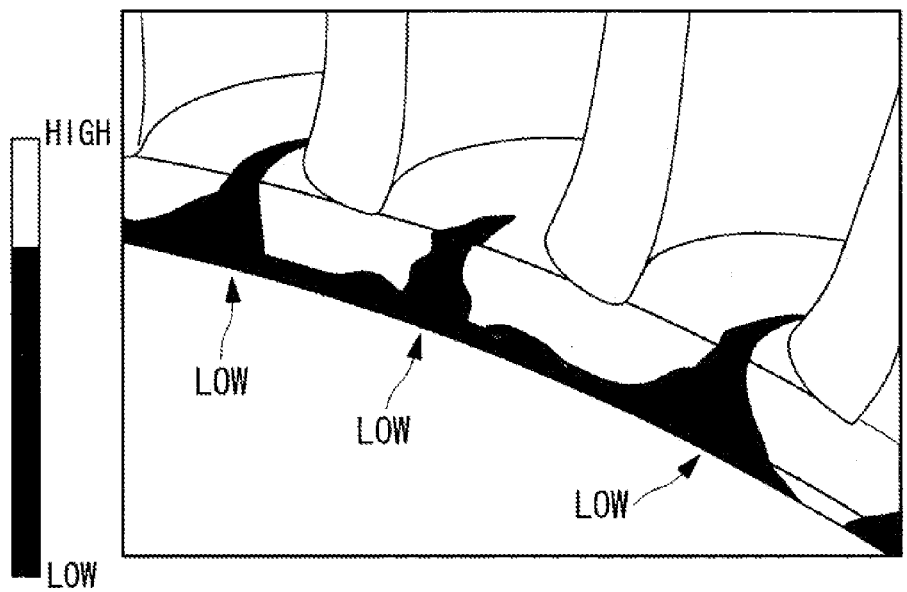
FIG. 6A illustrates contour lines showing the temperature distribution at the leading edge of a hub shroud of a third-stage stator blade in a comparative example of the gas turbine according to the first embodiment.
Figure 6B:
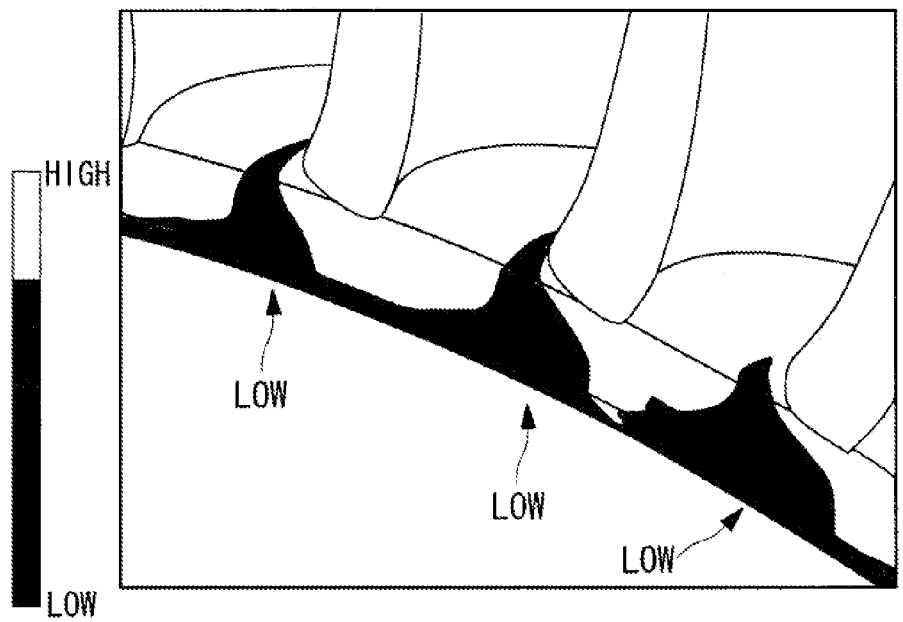
FIG. 6B illustrates contour lines showing the temperature distribution at the leading edge of the hub shroud of the third-stage stator blade in the gas turbine according to the first embodiment.

FIG. 6A illustrates the temperature distribution in the comparative example, whereas FIG. 6B illustrates the temperature distribution in this embodiment. As is apparent from these drawings, a reduced-temperature region in this embodiment is larger than that in the comparative example.

Figure 7:
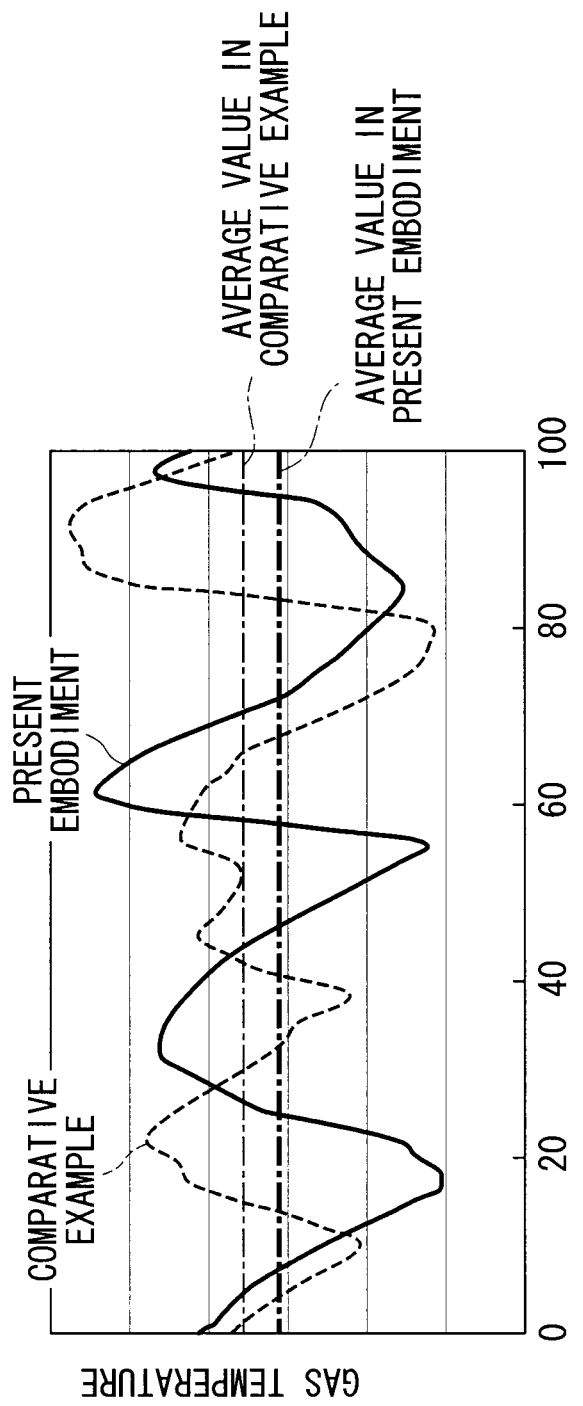
FIG. 7 is a graph illustrating the temperature of the leading edge of the hub shroud of the third-stage stator blade.

FIG. 7 illustrates the temperature distribution at the evaluated position 27 shown in FIG. 4. In the drawing, the thick line corresponds to this embodiment (see reference numeral 17 in FIG. 2), whereas the thin line corresponds to the comparative example (see reference numeral 24 in FIG. 2). It is apparent that, in this embodiment, a difference between maximum and minimum temperatures is smaller than that in the comparative example, and the average temperature is lower.

Accordingly, the following advantages are achieved by this embodiment.

Since the blade-count difference between the stator-blade segments 13 and 17 of the second-stage stator blade 3 and the third-stage stator blade 7 and the blade-count difference between the rotor-blade segments 11 and 15 of the first-stage rotor blade 1 and the second-stage rotor blade 5 are set to zero, a pressure distribution or temperature distribution of a relatively low periodicity of one to four cycles over the entire circumference, which can occur when the blade-count difference is one to four, can be avoided.

In addition, the relative position between the second-stage stator blade 3 and the third-stage stator blade 7 in the circumferential direction is adjusted by clocking so that the wake flow 23 produced by the stator-blade segments 13 of the second-stage stator blade 3 is guided to the leading edges of the stator-blade segments 17 of the third-stage stator blade 7 in a hub region ranging between 0% and 15% of the span of the stator-blade segments 17. This facilitates cooling of the hub region of the third-stage stator blade, thereby improving the cooling of the hub region, which is difficult in the related art. In particular, since the flow in the hub region is improved by clocking, the flow of sealing air guided from the axial cavity 20 formed at the hub side between the second-stage rotor blade and the third-stage stator blade can be used effectively, thereby allowing for cooling without leading to a reduction in gas-turbine efficiency.

Although the wake flow 23 is guided to the leading edges of the stator-blade segments 17 of the third-stage stator blade 7 in this embodiment, the present invention is not limited to thereto; the desired advantages can still be achieved so long as the wake flow 22 can be guided to a predetermined region of the leading edges of the stator-blade segments 17. For example, the wake flow may be guided to a ±¼ pitch region (one pitch being equal to a distance between adjacent stator-blade segments in the circumferential direction) in the circumferential direction with respect to the leading edge of each stator-blade segment 17 of the third-stage stator blade 7.

Furthermore, although cooling of the leading edge of the hub shroud 17a is improved by clocking in this embodiment, the clocking may be performed so as to improve cooling of the leading edge of the tip shroud 17b. Moreover, the clocking may be performed for improving the cooling of both the hub side and the tip side. For example, the leading-edge shape of the stator-blade segments 17 may be designed so that the 0% to 15% range and an 85% to 100% range of the length in the span direction from the hub side of the stator-blade segments coincide with reference numeral 22 in FIG. 2.

Although the blade count is set to be the same for the rotor blades 1 and 5 in addition to the stator blades 3 and 7 in this embodiment, the desired advantages can still be achieved by setting the same blade count only for the stator blades 3 and 7. However, setting the same blade count for the rotor blades as well is preferable since a low-periodicity pressure distribution and temperature distribution of the main-flow gas can be further reduced. Furthermore, setting the same blade count for the stator blades and/or the rotor blades in three consecutive stages can allow for a further reduction in the low-periodicity pressure distribution and temperature distribution.

Although the blade count is set to be the same in this embodiment, since the advantages can be sufficiently achieved so long as the pressure distribution and the temperature distribution of a low periodicity of about one to four cycles can be reduced, the blade-count difference between the stator blades or the rotor blades in upper and lower stages may alternatively be set to five or more.

Specifically, the blade-count difference is considered as follows.

When the blade-count ratio (between an n-th stage stator blade and an (n+1)-th stage stator blade) is 1:1 or 2:1, a favorable condition for all of the blade segments of the (n+1)-th stage stator blade in the circumferential direction can be brought about (that is, the wake flow from the n-th stage stator blade strikes the 0% to 15% Ht range of the leading edge of the (n+1)-th stage stator blade).

A favorable condition can be brought about for one of every two blade segments (i.e., for every other blade segment) in the (n+1)-th stage stator blade when the blade-count ratio is 1:2 or 3:2, for one of every three blade segments when the blade-count ratio is 1:3, 2:3, or 4:3, and for one of every four blade segments when the blade-count ratio is 1:4 or 3:4. In the case of a very large integer ratio, since the effect is reduced due to a reduced number of blade segments in a favorable condition, a blade count expressed by an integer ratio that is 4 or smaller is preferred as an effective configuration.

On the other hand, if the blade-count ratio is, for example, 20:15, which is equal to 4:3, since the blade-count difference is already five when the blade count is about 20, a very large integer ratio is not preferred from the viewpoint of blade-count difference.

Second Embodiment

Next, a second embodiment of the present invention will be described.

Similar to the first embodiment, cooling of the hub side or the tip side is improved by clocking in this embodiment. Therefore, since the same configurations are given to the rotor blades and the stator blades, descriptions thereof will be omitted.

In this embodiment, the relative position between the second-stage stator blade 3 and the third-stage stator blade 7 in the circumferential direction is set by clocking so that sealing air flowing over the surface of the hub shroud 17a of the third-stage stator blade 7 from the axial cavity 20 formed at the hub side of the second-stage rotor blade 5 and the third-stage stator blade 7 is made to flow toward a peak thermal stress position at the surface of the hub shroud 17a.

Thus, the peak thermal stress in the hub shroud 17a of the third-stage stator blade 7 can be reduced.

In particular, the clocking is performed based on CFD as described in the first embodiment. Specifically, the temperature distribution shown in FIGS. 6A and 6B is analyzed so that a locally high temperature position is defined as a position where peak thermal stress occurs. Then, by changing the relative position between the stator blades 3 and 7 in the circumferential direction by clocking, the relative position in the circumferential direction is set so that the sealing air flowing out from the cavity 20 is made to flow toward the peak thermal stress position.

Accordingly, with this embodiment, the flow of main-flow gas is adjusted by clocking so that cooling of the hub side or the tip side of the stator blades can be improved.

Third Embodiment

Next, a third embodiment of the present invention will be described.

Similar to the first embodiment, the pressure distribution and the temperature distribution in the circumferential direction are improved in this embodiment. Therefore, descriptions of configurations similar to those in the first embodiment will be omitted.

In this embodiment, the blade count of each of the rotor blades 1 and 5 and each of the stator blades 3 and 7 is set to 20 or more.

The blade-count difference between the second-stage stator blade 3 and the third-stage stator blade 7 and the blade-count difference between the third-stage stator blade 7 and the fourth-stage stator blade are set to zero, or to five or more.

The blade-count ratio between the second-stage stator blade, the third-stage stator blade, and the fourth-stage stator blade is set to an integer ratio ranging between 1 and 4 (but excluding 1:1:1).

By setting the blade-count ratio between the stator blades of three consecutive stages to an integer ratio ranging between 1 and 4 (e.g., 36:36:54 (2:2:3)), the denseness and sparseness of the intervals between blade segments (in the circumferential direction) repeat every set of four or fewer blade segments when upstream and downstream stator-blade segments are projected in the axial direction. Consequently, a pressure distribution or temperature distribution of a relatively low periodicity of one to four cycles can be avoided.

When the blade count of the stator-blade segments is fewer than 20, since the denseness and sparseness between blade segments in front and rear stages repeat every set of four or fewer blade segments even when setting the blade-count ratio to an integer ratio ranging between 1 and 4, 20 or more stator-blade segments are required.

Figure 8:
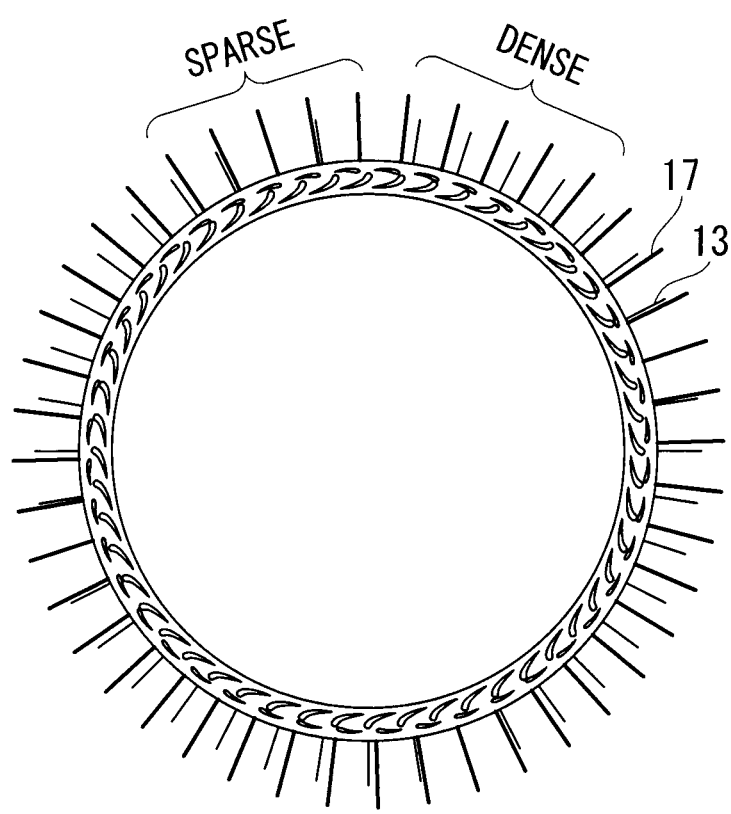
FIG. 8 is a longitudinal sectional view illustrating how intervals between blade segments (in the circumferential direction) of upstream and downstream stage stator blades are varyingly sparse and dense.
Figure 9:
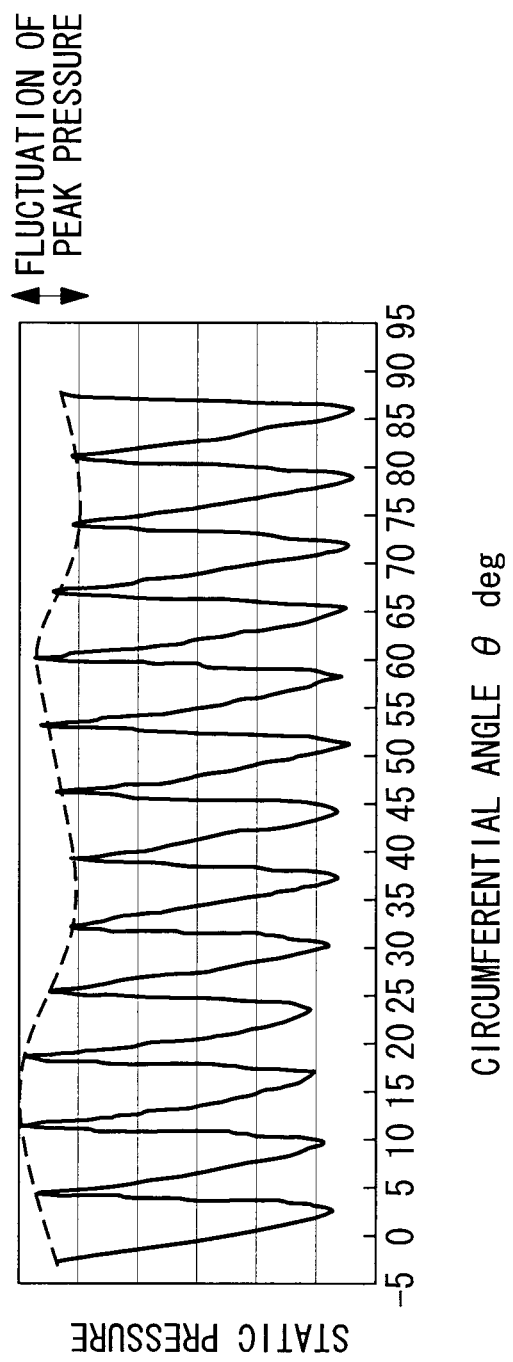
FIG. 9 is a graph illustrating the pressure distribution of main-flow gas in the circumferential direction.

FIG. 8 illustrates a reference example in which the denseness and sparseness of the intervals between blade segments repeat every set of five or more blade segments.

This embodiment can be combined with the first embodiment and the second embodiment.

Furthermore, the blade-count ratio in this embodiment may be set for the rotor blades in place of the stator blades or in addition to the stator blades. Specifically, the blade-count difference between the first-stage rotor blade 1 and the second-stage rotor blade 5 and the blade-count difference between the second-stage rotor blade 5 and the third-stage rotor blade are set to zero, or to five or more, and the blade-count ratio between the first-stage rotor blade, the second-stage rotor blade, and the third-stage rotor blade is set to an integer ratio ranging between 1 and 4 (but excluding 1:1:1).

REFERENCE SIGNS LIST

1 first-stage rotor blade
3 second-stage stator blade
5 second-stage rotor blade
7 third-stage stator blade
11, 15 rotor-blade segments
13, 17 stator-blade segments

The invention claimed is:

1. A gas turbine comprising:
an n-th stage stator blade having a plurality of stator-blade segments extending in a radial direction and provided at a predetermined pitch in a circumferential direction, n being a positive integer;
an n-th stage rotor blade disposed at a downstream side of the n-th stage stator blade in a direction of flow of combustion gas, the n-th stage rotor blade having a plurality of rotor-blade segments extending in the radial direction and provided around an outer periphery of a rotor at a predetermined pitch in the circumferential direction;
an (n+1)-th stage stator blade disposed at the downstream side of the n-th stage rotor blade in the direction of flow of the combustion gas, the (n+1)-th stage stator blade having a plurality of stator-blade segments extending in the radial direction and provided at a predetermined pitch in the circumferential direction; and
an (n+1)-th stage rotor blade disposed at the downstream side of the (n+1)-th stage stator blade in the direction of flow of the combustion gas, the (n+1)-th stage rotor blade having a plurality of rotor-blade segments extending in the radial direction and provided around the outer periphery of the rotor at a predetermined pitch in the circumferential direction,
wherein a blade-count difference between the stator-blade segments of the n-th stage stator blade and the stator-blade segments of the (n+1)-th stage stator blade is set to zero or to five or more, and/or a blade-count difference between the rotor-blade segments of the n-th stage rotor blade and the rotor-blade segments of the (n+1)-th stage rotor blade is set to zero or to five or more, and
wherein a relative position between the n-th stage stator blade and the (n+1)-th stage stator blade in the circumferential direction is set such that a wake flow produced by the stator-blade segments of the n-th stage stator blade is guided to a ±¼ pitch region in the circumferential direction with respect to a leading edge of each stator-blade segment of the (n+1)-th stage stator blade and within a range of 0% to 15% and/or a range of 85% to 100% of the length in a span direction from a hub side of the stator-blade segment of the (n+1)-th stage stator blade, one pitch being equal to a distance between adjacent stator-blade segments in the circumferential direction.

2. A gas turbine comprising:
an n-th stage stator blade having a plurality of stator-blade segments extending in a radial direction and provided at a predetermined pitch in a circumferential direction, n being a positive integer;
an n-th stage rotor blade disposed at a downstream side of the n-th stage stator blade in a direction of flow of combustion gas, the n-th stage rotor blade having a plurality of rotor-blade segments extending in the radial direction and provided around an outer periphery of a rotor at a predetermined pitch in the circumferential direction;
an (n+1)-th stage stator blade disposed at the downstream side of the n-th stage rotor blade in the direction of flow of the combustion gas, the (n+1)-th stage stator blade having a plurality of stator-blade segments extending in the radial direction and provided at a predetermined pitch in the circumferential direction; and
an (n+1)-th stage rotor blade disposed at the downstream side of the (n+1)-th stage stator blade in the direction of flow of the combustion gas, the (n+1)-th stage rotor blade having a plurality of rotor-blade segments extending in the radial direction and provided around the outer periphery of the rotor at a predetermined pitch in the circumferential direction, wherein a blade-count difference between the stator-blade segments of the n-th stage stator blade and the stator-blade segments of the (n+1)-th stage stator blade is set to zero or to five or more, and/or a blade-count difference between the rotor-blade segments of the n-th stage rotor blade and the rotor-blade segments of the (n+1)-th stage rotor blade is set to zero or to five or more, and wherein a relative position between the n-th stage stator blade and the (n+1)-th stage stator blade in the circumferential direction is set such that sealing air flowing over a surface of a hub shroud of the (n+1)-th stage stator blade from a cavity formed at a hub side of the n-th stage rotor blade and the (n+1)-th stage stator blade is made to flow toward a peak thermal stress position at the surface of the hub shroud.

3. The turbine according to claim 1 or 2, further comprising:

an (n+2)-th stage stator blade disposed at the downstream side of the (n+1)-th stage rotor blade in the direction of flow of the combustion gas, the (n+2)-th stage stator blade having a plurality of stator-blade segments extending in the radial direction and provided at a predetermined pitch in the circumferential direction; and an (n+2)-th stage rotor blade disposed at the downstream side of the (n+2)-th stage stator blade in the direction of flow of the combustion gas, the (n+2)-th stage rotor blade having a plurality of rotor-blade segments extending in the radial direction and provided around the outer periphery of the rotor at a predetermined pitch in the circumferential direction, wherein a blade-count difference between the stator-blade segments of the (n+1)-th stage stator blade and the stator-blade segments of the (n+2)-th stage stator blade is set to zero or to five or more, and/or a blade-count difference between the rotor-blade segments of the (n+1)-th stage rotor blade and the rotor-blade segments of the (n+2)-th stage rotor blade is set to zero or to five or more.

4. A gas turbine comprising:

an n-th stage stator blade having a plurality of stator-blade segments extending in a radial direction and provided at a predetermined pitch in a circumferential direction, n being a positive integer;

an n-th stage rotor blade disposed at a downstream side of the n-th stage stator blade in a direction of flow of combustion gas, the n-th stage rotor blade having a plurality of rotor-blade segments extending in the radial direction and provided around an outer periphery of a rotor at a predetermined pitch in the circumferential direction;

an (n+1)-th stage stator blade disposed at the downstream side of the n-th stage rotor blade in the direction of flow of the combustion gas, the (n+1)-th stage stator blade having a plurality of stator-blade segments extending in the radial direction and provided at a predetermined pitch in the circumferential direction;

an (n+1)-th stage rotor blade disposed at the downstream side of the (n+1)-th stage stator blade in the direction of flow of the combustion gas, the (n+1)-th stage rotor blade having a plurality of rotor-blade segments extending in the radial direction and provided around the outer periphery of the rotor at a predetermined pitch in the circumferential direction;

an (n+2)-th stage stator blade disposed at the downstream side of the (n+1)-th stage rotor blade in the direction of flow of the combustion gas, the (n+2)-th stage stator blade having a plurality of stator-blade segments extending in the radial direction and provided at a predetermined pitch in the circumferential direction; and an (n+2)-th stage rotor blade disposed at the downstream side of the (n+2)-th stage stator blade in the direction of flow of the combustion gas, the (n+2)-th stage rotor blade having a plurality of rotor-blade segments extending in the radial direction and provided around the outer periphery of the rotor at a predetermined pitch in the circumferential direction, wherein a blade count of the stator-blade segments and a blade count of the rotor-blade segments are set to 20 or more, wherein a blade-count difference between the stator-blade segments of the n-th stage stator blade and the stator-blade segments of the (n+1)-th stage stator blade and a blade-count difference between the stator-blade segments of the (n+1)-th stage stator blade and the stator-blade segments of the (n+2)-th stage stator blade are set to zero or to five or more, and/or a blade-count difference between the rotor-blade segments of the n-th stage rotor blade and the rotor-blade segments of the (n+1)-th stage rotor blade and a blade-count difference between the rotor-blade segments of the (n+1)-th stage rotor blade and the rotor-blade segments of the (n+2)-th stage rotor blade are set to zero or to five or more, and wherein a blade-count ratio of the stator-blade segments between the n-th stage stator blade, the (n+1)-th stage stator blade, and the (n+2)-th stage stator blade or a blade-count ratio of the rotor blade segments between the n-th stage rotor blade, the (n+1)-th stage rotor blade, and the (n+2)-th stage rotor blade is set to an integer ratio ranging between 1 and 4, but excluding 1:1:1.

* * * * *